(12) United States Patent
Kim et al.

(10) Patent No.: US 12,722,541 B2
(45) Date of Patent: Sep. 1, 2026

(54) VEHICLE SEAT FOR ONE-TOUCH SWITCHING TO RELAXATION MODE

(71) Applicants: Hyundai Motor Company, Seoul (KR); Kia Corporation, Seoul (KR); DAS CO., LTD, Gyeongju-si (KR)

(72) Inventors: Byeong-Kwang Kim, Suwon-Si (KR); Jung-Eun Lee, Seoul (KR); Chang-Ju Gi, Seoul (KR); Sang-Ho Kim, Incheon (KR); Seok-Hwan Kim, Suwon-Si (KR); Sang-Seok Seong, Gyeongju-Si (KR); Yong-Jae Sung, Ulsan (KR); Dong-Cheol Park, Gyeongju-Si (KR)

(73) Assignees: Hyundai Motor Company, Seoul (KR); Kia Corporation, Seoul (KR); DAS CO., LTD., Gyeongju-si (KR)

( * ) Notice: Subject to any disclaimer, the term of this patent is extended or adjusted under 35 U.S.C. 154(b) by 74 days.

(21) Appl. No.: 18/679,289

(22) Filed: May 30, 2024

(65) Prior Publication Data

US 2025/0170926 A1 May 29, 2025

(30) Foreign Application Priority Data

Nov. 27, 2023 (KR) ........................ 10-2023-0166508

(51) Int. Cl.
*B60N 2/12* (2006.01)
*B60N 2/235* (2006.01)

(52) U.S. Cl.
CPC ........... *B60N 2/123* (2013.01); *B60N 2/2354* (2013.01)

(58) Field of Classification Search
CPC .............................. B60N 2/123; B60N 2/2354
(Continued)

(56) References Cited

U.S. PATENT DOCUMENTS 5,052,751 A * 10/1991 Hayakawa ............. B60N 2/123 297/341
5,352,019 A * 10/1994 Bauer .................... B60N 2/123 297/341

(Continued)

FOREIGN PATENT DOCUMENTS

KR 10-2022-0146649 A 11/2022
KR 10-2023-0124795 A 8/2023

(Continued)

OTHER PUBLICATIONS

Kim, Byeong Kwang; Kim, Sang Ho; Sung, Yong Jae; Park, Dong Cheol. "Manual Relaxation Seat Mechanism Development and Evaluation for Emerging Market", Hyundai Motor Group Academic Confer-ence, Jul. 14, 2023. The document has been submitted with a public notice exception claim in Korean Patent Appl'n No. 10-2023-0166508.

*Primary Examiner* — Jose V Chen
(74) *Attorney, Agent, or Firm* — MORGAN, LEWIS & BOCKIUS LLP

(57) ABSTRACT

In a vehicle seat for one-touch switching to a relaxation mode, a lever link operating in conjunction with a relaxation lever when a relaxation lever is raised up, or a relaxation lever bracket operating in conjunction with a motor cable of an actuator when a relaxation button lever is pushed down locks off a stepless brake. Thus, a rack bar is moved along a link tracking path. As a result, an angle of a cushion frame is changed in the upward direction, and a relaxation cable operated in conjunction with the relaxation lever link or a relaxation memory locks off the relaxation memory. In the present manner, a seat back is moved backward, enabling one-touch relaxation mechanism.

19 Claims, 10 Drawing Sheets

(58) Field of Classification Search
USPC .......................................................... 297/353
See application file for complete search history.

(56) References Cited

U.S. PATENT DOCUMENTS

| | | | | |
|---|---|---|---|---|
| 2006/0138843 | A1* | 6/2006 | Becker | B60N 2/123<br>297/378.1 |
| 2012/0019037 | A1* | 1/2012 | Rohnert | B60N 2/0818<br>297/378.1 |
| 2013/0057043 | A1* | 3/2013 | Ngiau | B60N 2/123<br>297/378.1 |
| 2014/0138998 | A1* | 5/2014 | Christoffel | B60N 2/2358<br>297/367 R |
| 2015/0042140 | A1* | 2/2015 | Utzinger | B60N 2/0875<br>297/344.1 |
| 2016/0280098 | A1* | 9/2016 | Frye | B60N 2/0248 |
| 2017/0008425 | A1* | 1/2017 | Nagura | B60N 2/0715 |
| 2017/0158092 | A1* | 6/2017 | Kojima | B60N 2/2227 |
| 2017/0166094 | A1* | 6/2017 | Frye | B60N 2/4214 |
| 2017/0368962 | A1* | 12/2017 | Auer | B60N 2/123 |
| 2018/0215288 | A1* | 8/2018 | Hiemstra | B60N 2/20 |
| 2020/0217637 | A1* | 7/2020 | Del Vecchio | B60N 2/0272 |
| 2021/0155126 | A1* | 5/2021 | Ploch | B60N 2/3011 |
| 2022/0324357 | A1* | 10/2022 | Zang | B60N 2/0825 |
| 2023/0155765 | A1 | 5/2023 | Zhang et al. | |
| 2023/0322133 | A1* | 10/2023 | Faruque | B60N 2/2354<br>297/362.12 |

FOREIGN PATENT DOCUMENTS

| | | | | |
|---|---|---|---|---|
| WO | WO-2010040072 | A1 * | 4/2010 | B60N 2/3079 |
| WO | WO-2022174916 | A1 * | 8/2022 | B60N 2/06 |

* cited by examiner

STANDARD MODE (A)
RELAXATION MODE (B)
1
6
2
6
2
32
22
9
<VIEW OF INTERNAL CONFIGURATION>
7
39
3c
3a
3b
3
31
23
25
28
9
21

FIG. 2

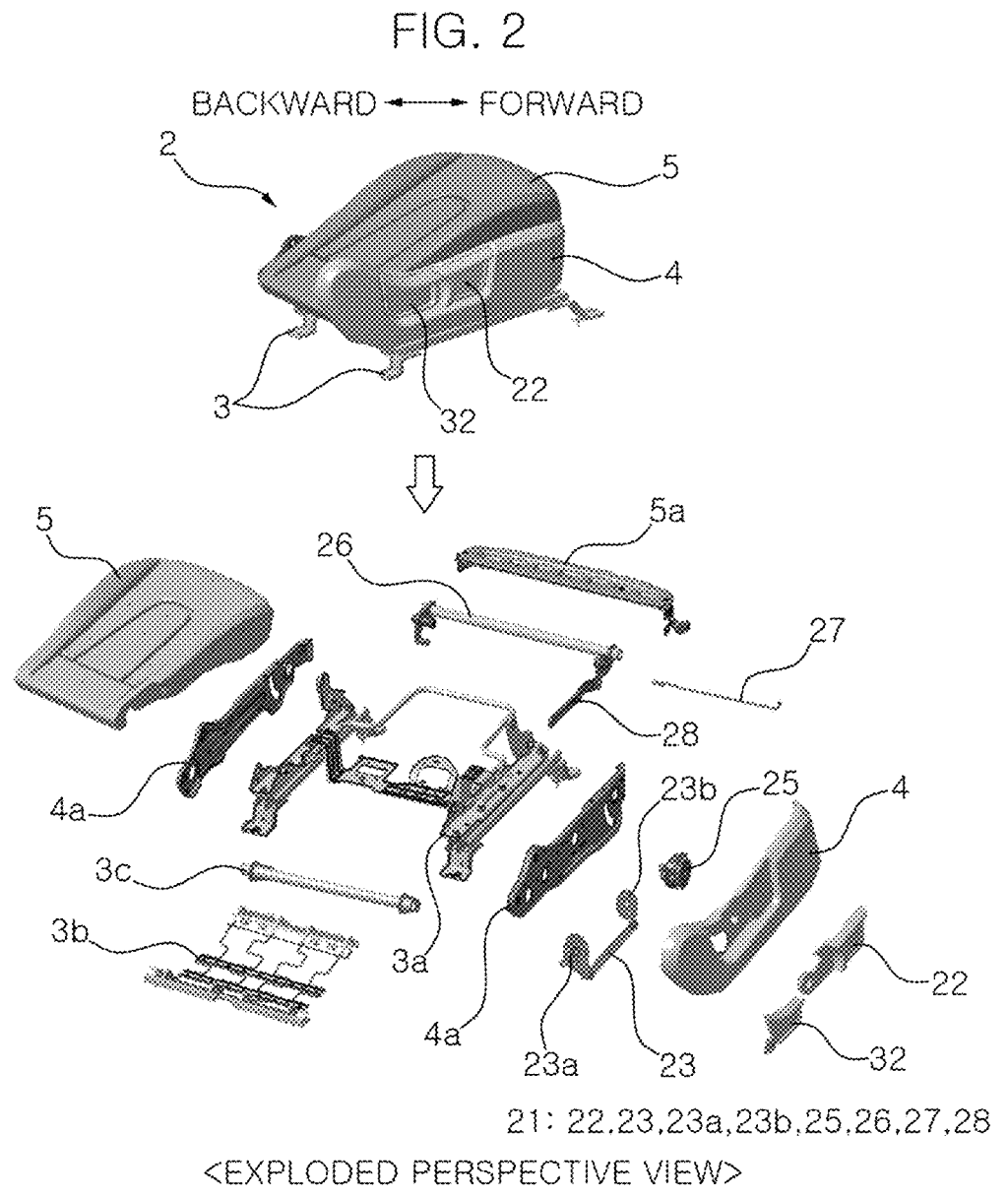

BACKWARD ⟷ FORWARD 2
5
4
3
32
22

5
26
5a
27
28
4a
23b
25
4
3c
3b
3a
4a
22
23a
23
32

21: 22,23,23a,23b,25,26,27,28

<EXPLODED PERSPECTIVE VIEW>

<STATE WHERE SEAT BACK IS POSITIONED REARMOST>

① : LOCKING-OFF OF RELAX LEVER
② : 'A' BRKT ROTATION OF RELAX LEVER LINK
③ : RELAX LEVER CONNECT BRKT
④ : BRKT ROTATION OF STEPLESS BRAKE (LOCKED-OF/OFF)

<EXPLODED PERSPECTIVE VIEW>

VEHICLE SEAT FOR ONE-TOUCH SWITCHING TO RELAXATION MODE

CROSS-REFERENCE TO RELATED APPLICATION

The present application claims priority to Korean Patent Application No. 10-2023-0166508, filed on Nov. 27, 2023, the entire contents of which is incorporated herein for all purposes by this reference.

BACKGROUND OF THE PRESENT DISCLOSURE

Field of the Present Disclosure

The present disclosure relates to a vehicle seat, and more particularly, to a vehicle seat for one-touch switching to a relaxation mode, the vehicle seat being capable of realizing one-touch relaxation positioning for enabling a seat back and a seat cushion to be operated in conjunction with each other.

Description of Related Art

Typically, vehicle seats are configured with a seat back, a seat cushion, and a recliner for adjusting an angle of the seat back, and are provided with various additional functions for improving a user's convenience.

Examples of the seat provided with various additional functions include a manual relaxation seat in which the user can manually change an angle of the seat cushion.

As an exemplary embodiment of the present disclosure, the manual relaxation seat applies a relaxation seat mechanism. A structure of the relaxation seat mechanism is configured with a link structure and an angle fixation apparatus (for example, a combination of a stepless brake and a rack gear), and thus an angle of the seat cushion with respect to the cushion frame may be changed.

To the present end, the manual relaxation mechanism allows a user to operate the stepless brake positioned on a lateral side of the seat cushion and to drive a cushion link and the rack gear by raising the cushion frame of the seat cushion after disengaging the stepless brake and the rack gear with each other. Thus, an angle of the cushion frame is changed along a link tracking path.

Accordingly, a relaxation mode for the seat back, in which the seat back is reclined by releasing a recliner is executed after a relaxation mode for the seat cushion, in which the seat cushion is raised up by releasing of the continuous pressure, which is the operation of the manual relaxation mechanism. When this is done, the relaxation mode for the seat cushion and the seat back, in which the user adopts a reclined posture to lie on the seat cushion and the seat back, may be switched from a standard mode in which the user sits on the seat cushion.

However, the structure of the relaxation seat mechanism causes the inconvenience of having to perform a two-step operation.

That is, the relaxation mode for the manual relaxation seat, which is executed by the relaxation seat mechanism, is an inconvenient technique in which the cushion frame is required to be primarily operated in the relaxation mode and subsequently, a back recliner is required to be secondarily operated in the relaxation mode.

When the user wants to switch the manual relaxation seat from the relaxation mode back to the standard mode, the relaxation seat mechanism causes the inconvenience in returning to the standard mode because the seat back and the seat cushion are not structurally operated in conjunction with each other on the back side thereof.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle seat for one-touch switching to a relaxation mode, the vehicle seat being configured for realizing one-touch relaxation positioning for operations of a seat back and a seat cushion in conjunction with each other and of simultaneously realizing cushion angle adjustment function and seat-back rear adjustment function for positioning the seat back and the seat cushion. With the present vehicle seat, the inconvenience of having to separately operate the seat cushion and the seat back may be eliminated.

To accomplish the above-mentioned object, according to one aspect of the present disclosure, there is provided a vehicle seat for one-touch switching to a relaxation mode, the vehicle seat including: a relaxation lever operated to switch the seat cushion and the seat back from a standard mode to a relaxation mode; and a recliner lever operating a recliner of the seat back, the recliner lever being provided on a lateral side of the seat cushion, wherein the seat cushion includes: a relaxation lever link locking off a stepless brake by rotating the stepless brake in raising up the relaxation lever; and a rack bar moved along a link tracking path in a state where the rack bar is gear-engaged with the stepless brake so that an angle of the seat cushion is changed in a front direction, when raising up a front portion of a cushion frame, and wherein the seat back includes: a relaxation cable pulled by the relaxation lever link in a state of being fixed to an upper portion of a back frame, in raising up the relaxation lever; and a relaxation memory rotated by the relaxation cable in response that the recliner is locked off, so that an angle of the seat back is changed for reclining.

In the vehicle seat, the relaxation lever and the recliner lever may be arranged adjacent to each other.

In the vehicle seat, the relaxation lever link may include a shape of a straight-line bar and may include a relaxation cable bracket at a first end portion thereof and a stepless brake bracket at a second end portion thereof, the relaxation cable bracket may pull the relaxation cable by being rotated in the counterclockwise direction in response that the relaxation lever link in a shape of a straight-line bar is moved forward, and the stepless brake bracket may lock off the stepless brake by being rotated in the counterclockwise direction, in response that the relaxation lever link in a shape of a straight-line bar is moved forward thereof.

In the vehicle seat, the stepless brake bracket may be coupled to the stepless brake, rotating the stepless brake.

In the vehicular seat, the rack bar may be connected to a spring bracket of a spring rod coupled to one side of the cushion frame, and a torsional spring providing a restoring force to the seat cushion may be coupled to the spring bracket of the spring rod.

In the vehicle seat, the relaxation memory may be coupled to the recliner and may be configured with a cam and a lower tooth that are rotated by pulling the relaxation cable, and the rotation of the cam and the lower tooth may enable the relaxation memory to switch to a locked-off state so that the seat back is moved backward in the relaxation mode for the seat cushion.

To accomplish the above-mentioned object, according to another aspect of the present disclosure, there is provided a vehicle seat for one-touch switching to a relaxation mode, the vehicle seat including: a relaxation button lever operated to switch a seat cushion and a seat back from a standard mode to a relaxation mode; and a recliner lever operating a recliner of the seat back, the recliner lever being provided on a lateral side of the seat cushion, wherein the seat cushion includes: an actuator driven in pushing down the relaxation button lever; a relaxation lever bracket moved in conjunction with a motor cable pulled by the actuator; a stepless brake locked off by the relaxation lever bracket; and a rack bar, a link tracking path for changing an angle of the cushion frame in an upward direction being formed in a state where the rack bar comes into contact with the stepless brake, and wherein the seat back includes: a relaxation memory connected to the motor cable so that the seat back is moved backward in a relaxation mode for the seat cushion; and a relaxation cable operated in conjunction with movement of the relaxation memory, the opposite portion thereof, pulled by the relaxation memory being fixed to an upper portion of a back frame.

In the vehicle seat, the relaxation button lever and the actuator may be connected to each other by a signal line, and a lower portion in a shape of a circular plate, coupled to the stepless brake, of the relaxation lever bracket may be connected to the relaxation cable, and thus the relaxation lever bracket may be operated in conjunction with movement of the motor cable.

In the vehicle seat, the stepless brake may be gear-engaged with the rack bar positioned on one side of the cushion frame to be moved along the link tracking path, and a spring bracket to which the rack bar is connected may be provided on a spring rod including a torsional spring providing a restoring force to the seat cushion.

In the vehicle seat, the relaxation memory may be coupled to the recliner locked off by the recliner lever and may be configured with a cam and a lower tooth that are rotated by pulling the relaxation cable, and the cam and the lower tooth may be rotated in the opposite direction to enable the relaxation memory to switch to a locked-off state so that the seat back is moved backward in the relaxation mode for the seat cushion.

The vehicle seat according to an exemplary embodiment of the present disclosure can simultaneously switch between the standard mode and relaxation mode. This switching is achieved through seat positioning for cushion angle adjustment and seat-back rear adjustment using a configuration of a relaxation lever-type seat mechanism for one-touch relaxation. Thus, a manual relaxation seat may be operated without the inconvenience of having to separately operate both the seat cushion and the seat back.

Accordingly, the vehicle seat according to the present seat can achieve the relaxation seat mechanism by enabling one-touch adjustment of the seat cushion and the seat back in conjunction with each other using the relaxation lever, providing the same relaxation mode as in the related art. The weight of the power relaxation mechanism and the manufacturing cost thereof may be reduced. The vehicle seat according to an exemplary embodiment of the present disclosure can include a higher positioning speed for a power relaxation seat than in the related art. Additionally, the vehicle seat can simultaneously perform cushion height adjustment function and seat-back rear adjustment function, providing optimal convenience according to a passenger's requirements.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 2 and FIG. 3 are views, each illustrating a configuration of a cushion angle adjustment unit that forms a relaxation seat mode execution apparatus according to an exemplary embodiment of the present disclosure.

Figure 1:
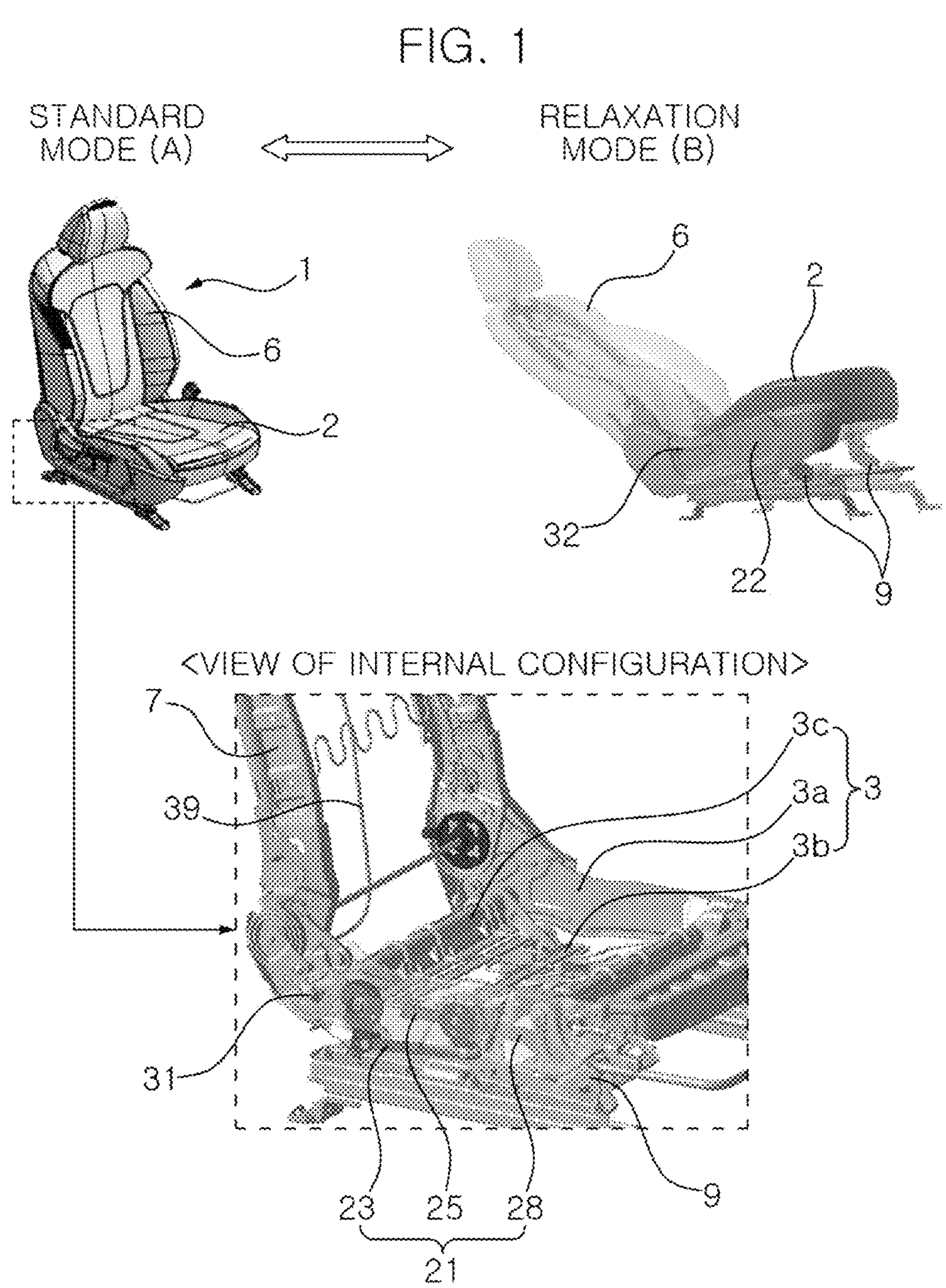
FIG. 1 is a view exemplarily illustrating a vehicle seat of one-touch switching to a relaxation mode according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

An exemplary embodiment of the present disclosure is in detail described below with reference to the accompanying drawings. The exemplary embodiment of the present disclosure is exemplary and may be practiced in various forms by a person of ordinary skill in the art to which the present disclosure pertains. Therefore, the present disclosure is not limited to the exemplary embodiment described below.

With reference to FIG. 1, a vehicle seat 1 includes a relaxation mode execution apparatus.

The relaxation mode execution apparatus enables a seat cushion 2 and a seat back 6 to be operated in conjunction with each other by operating a relaxation lever 22 with respect to the seat cushion 2 for relaxation. Thus, switching between a standard mode and a relaxation mode is performed through a backward conjunctive motion in a one-touch manner. Accordingly, the vehicle seat 1 is featured as a vehicle seat for one-touch switching to a relaxation mode.

To the present end, the seat cushion 2 includes a cushion frame 3, an external cover 4, a cushion 5, and other components that include the same configurations as components of a typical seat cushion. The cushion frame 3 includes a track 3*a* for seat movement, the lateral side thereof being connected in the leftward-rightward direction by a pipe 3*c*, and a suspension spring 3*b* for shock absorbing. The external cover 4 covers a lateral surface of the cushion frame 3, and the relaxation lever 22 and a recliner lever 32 are provided on external cover 4. A cushion panel 5*a* is placed over a front portion of the cushion 5.

Furthermore, the seat cushion 2 applies a structure which is hinged on the track 3*a*. The seat cushion 2 raises the cushion frame 3 using a front cushion link 9 positioned in front of the seat cushion 2 and a rear cushion link 9*a* positioned on the rear of the seat cushion 2. Thus, the switching between the standard mode and the relaxation mode is performed.

Therefore, the seat cushion 2 includes the configuration as the typical seat cushion. However, the difference from the typical seat cushion is that an internal plate 4*a*, attached to the internal lateral side of the external cover 4, is coupled to the lateral side of the track 3*a*, providing a space in which components of a lever-type cushion angle adjustment unit 21 are provided.

Figure 4:
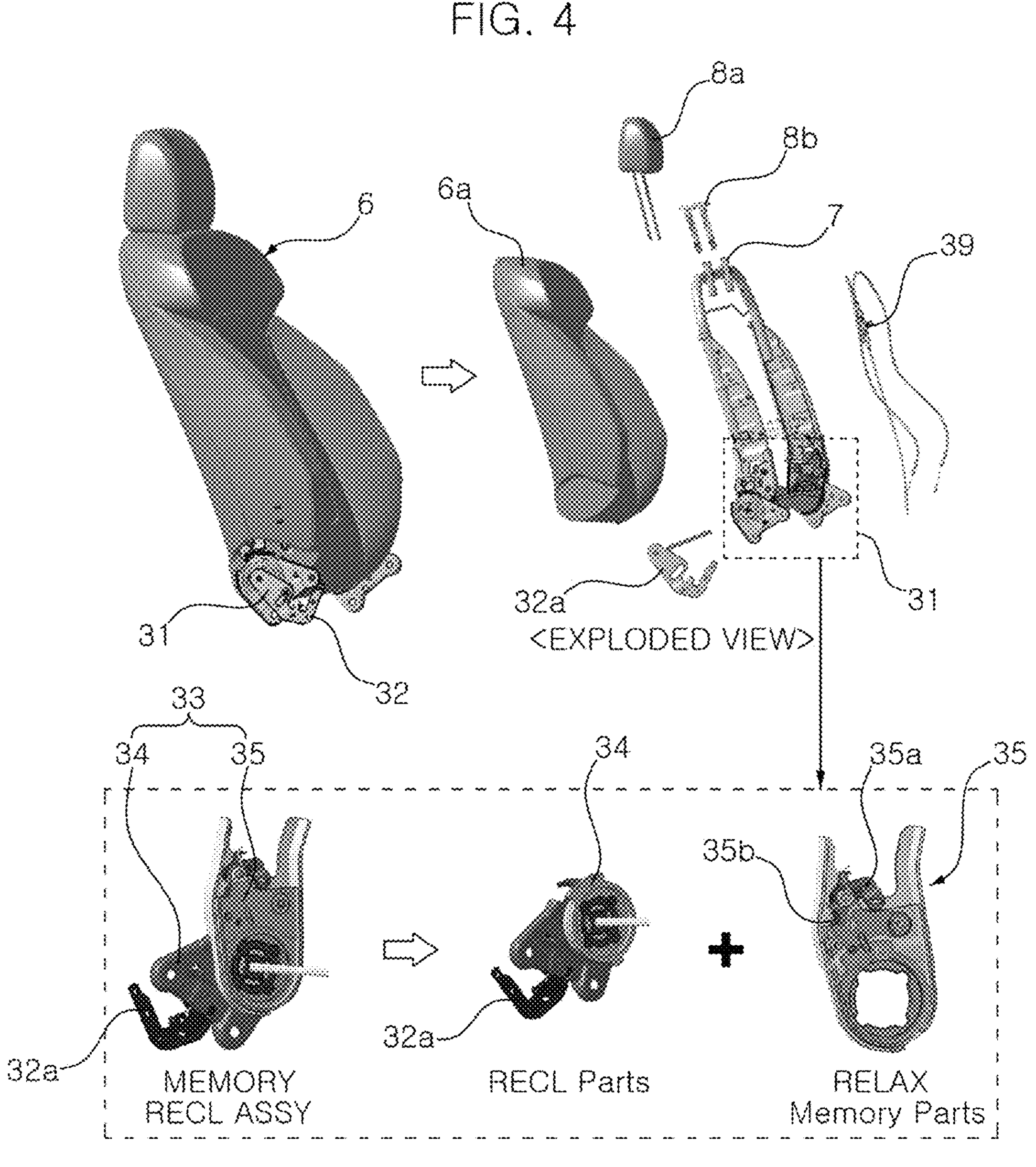
FIG. 4 and FIG. 5 are views, each illustrating a configuration of a back angle adjustment unit that forms the relaxation seat mode execution apparatus according to an exemplary embodiment of the present disclosure.

As an exemplary embodiment of the present disclosure, with reference to FIG. 4, the seat back 6 includes a back frame 7 surrounded by a seat back cover 6*a*, and a head rest 8*a* having a headrest guide 8*b* and coupled to the back frame 7. The lower portion of the back frame 7 is connected to the rear portion of the cushion frame 3 with the track 3*a* in between, being positioned on the rear of the seat cushion 2.

Therefore, the seat back 6 and the head rest 8*a* include the same configurations as a typical seat back and headrest. However, the difference is that a space in which a back angle adjustment unit 31 is provided is provided in the lower portion of the back frame 7 and that a space in which a relaxation cable 39, running toward the head rest 8*a*, is provided is provided in the inside space of the back frame 7.

To the present end, the relaxation mode execution apparatus is configured with the lever-type cushion angle adjustment unit 21 and a back angle adjustment unit 31, which are arranged adjacent to each other, and is mounted on one of upper left and right lateral sides of the seat cushion 2. However, the relaxation mode execution apparatus may be on the upper right lateral side thereof.

The lever-type cushion angle adjustment unit 21 includes the relaxation lever 22, a relaxation lever link 23, a stepless brake 25, and a rack bar 28, and the back angle adjustment unit 31 includes the recliner lever 32 and the relaxation cable 39. In the instant case, the stepless brake 25, as one component of a seat height adjustment apparatus (that is, the seat cushion 2), is typically applied in a seat to move the seat upward, to keep the seat locked against the occupant's weight, to keep the seat unlocked as needed.

As an exemplary embodiment of the present disclosure, the relaxation lever 22 is exposed at one lateral side of the seat cushion 2 to be operated by a user 100. When the relaxation lever 22 is operated, the switching between the standard mode and the relaxation mode with respect to the seat cushion 2 is performed. When the relaxation lever 22 is released (that is, when the relaxation lever 22 is raised up), the relaxation lever link 23 simultaneously enables both a forward movement (and a backward movement) and a counterclockwise rotation (and a clockwise rotation). The stepless brake 25 holds the rack bar 28 in place and releases the rack bar 28.

Gear teeth are formed on one surface (that is, an upper surface) of the rack bar 28. The rack bar 28 is engaged with a gear of the stepless brake 25. Thus, when switching from the standard mode to the relaxation mode, the rack bar 28 may be moved forward thereof. In the instant case, when switching from the relaxation mode to the standard mode, the rack bar 28 is moved backward thereof.

As an exemplary embodiment of the present disclosure, the recliner lever 32, along with the relaxation lever 22, is exposed at one lateral side of the seat cushion 2 to be operated with the user 100's hand. Then, when the recliner lever 32 is operated, the switching between the standard mode and the relaxation mode with respect to the seat back 6 is performed.

The relaxation cable 39 is pulled forward by the counterclockwise rotation of the relaxation lever 22, reclining the back frame 7 backward thereof. Thus, the seat back 6 switches from the standard mode to the relaxation mode. In the instant case, when switching from the relaxation mode to the standard mode, the relaxation cable 39 is pushed backward thereof.

Therefore, relaxation mode execution apparatus is configured with two assembly components, along with the back angle adjustment unit 31, with the lever-type cushion angle adjustment unit 21 as a cushion tilting structure.

With the present configuration, the lever-type cushion angle adjustment unit 21 and the back angle adjustment unit 31 are assembled for the switching between the standard mode and the relaxation mode for the seat. Thus, a manual relaxation mode function for the vehicle seat 1 is performed.

Accordingly, problems, experienced when manually switching from the standard mode to the relaxation mode for the vehicle seat 1 generally, may be addressed. For example, the inconvenience that the cushion frame 3 is primarily required to be operated in the relaxation mode and then a recliner 34 is secondarily required to be operated in the relaxation mode may be eliminated. Furthermore, the inconvenience that when the user 100 needs to switch from the relaxation mode to the standard mode, the seat back 6 does not return to the original state thereof because the backward conjunctive motion does not occur may be eliminated.

Figure 3:
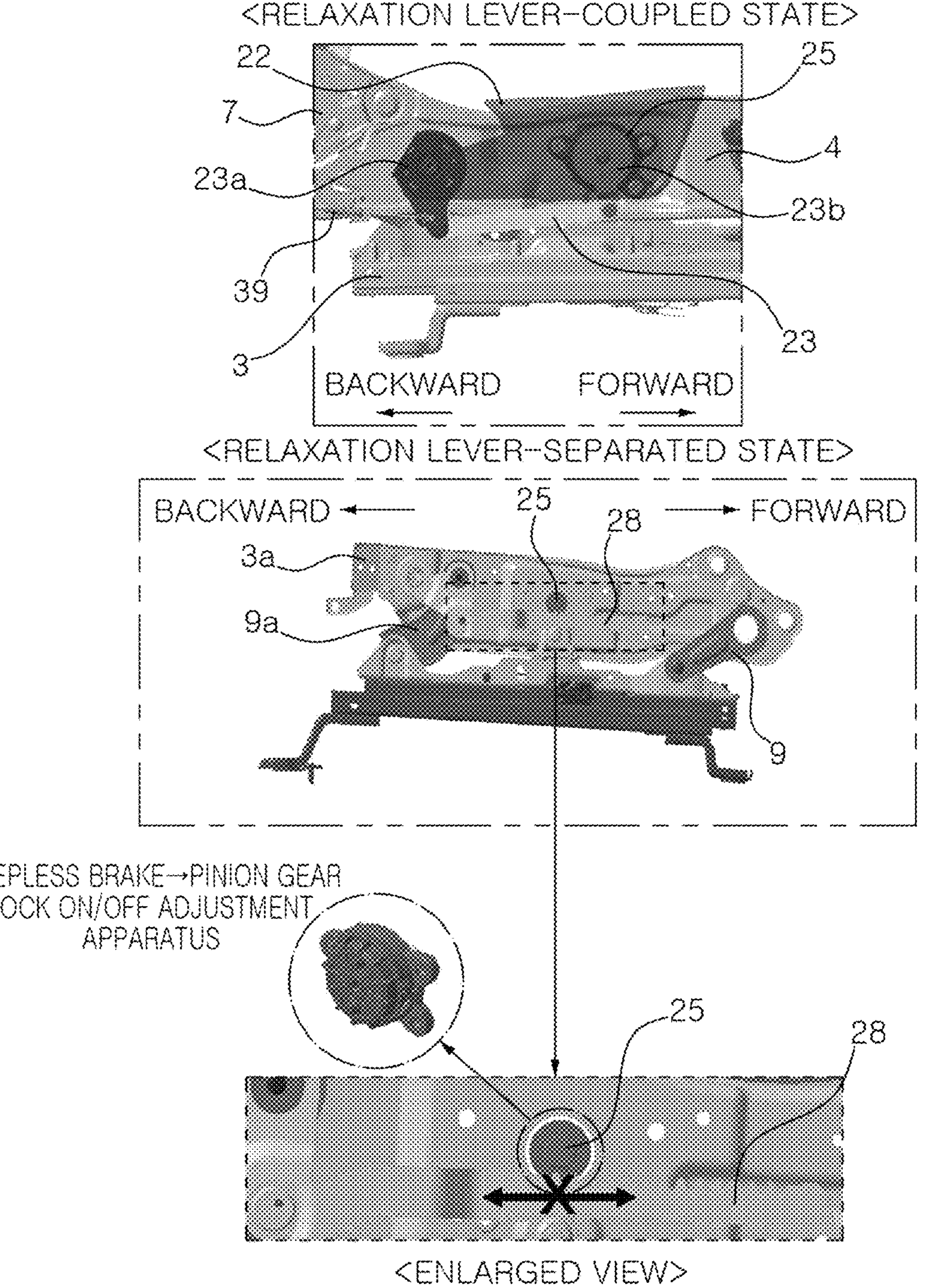

FIG. 2 and FIG. 3 illustrate a detailed configuration of the lever-type cushion angle adjustment unit 21.

As illustrated, the lever-type cushion angle adjustment unit 21 is configured with the relaxation lever 22, the relaxation lever link 23, the stepless brake 25, a spring rod 26, a torsional spring 27, and the rack bar 28. Accordingly, the seat cushion 2 of the vehicle seat 1 is operated in the relaxation mode, and at the same time, is operated in conjunction with a relaxation mode for the seat back 6.

As an exemplary embodiment of the present disclosure, the relaxation lever 22 is connected to the relaxation lever link 23 of which one side (that is, the stepless brake bracket 23b side) is moved upwards when the relaxation lever 22 on the external cover 4 is operated, and the relaxation lever link 23 includes a shape of a straight-line bar and is positioned between the stepless brake 25 and the recliner 34.

The relaxation lever link 23 in a shape of a straight-line bar includes the relaxation cable bracket 23a at one end portion thereof and a stepless brake bracket 23b at the other end portion thereof. The relaxation cable bracket 23a pulls the relaxation cable 39. The stepless brake bracket 23b rotates the stepless brake 25 in the counterclockwise direction thereof. The relaxation cable bracket 23a and the stepless brake bracket 23b are circular-plate-shaped with the exception of the straight bars and the connection portions.

As an exemplary embodiment of the present disclosure, the stepless brake 25 is coupled to the stepless brake bracket 23b of the relaxation lever link 23 in a state of being fixed to the internal plate 4a. When the movement of the relaxation lever link 23 in a straight line (that is, forward) by the relaxation lever 22 rotates the stepless brake bracket 23b in the counterclockwise direction, the stepless brake 25 switches to a brake release state.

As an exemplary embodiment of the present disclosure, the spring rod 26, the torsional spring 27, and the rack bar 28 move up the seat cushion 2 when operating in the relaxation mode and provide a force that restores the seat cushion 2 to the original state thereof, when switching to the standard mode.

To the present end, the spring rod 26 is formed in the shape of a straight-line hollow rod and has spring brackets at both the end portions thereof. Furthermore, the torsional spring 27 is coupled to the spring bracket of the spring rod 26, and is twisted in the relaxation mode and provides a restoring force when switching to the standard mode. The rack bar 28 is connected to the spring bracket at one side of the spring rod 26 and is positioned toward the stepless brake 25.

In a stepless brake-constrained state, a rack gear, including a rack gear formed on the upper predetermined section of the rack bar 28, is engaged with a pinion gear formed on an external surface of the stepless brake 25. In the instant state, when the stepless brake 25 is released by operating the relaxation lever 22, the rack bar 28 is moved in a straight line, enabling the seat cushion 2 to switch to the relaxation mode and the standard mode.

Figure 5:
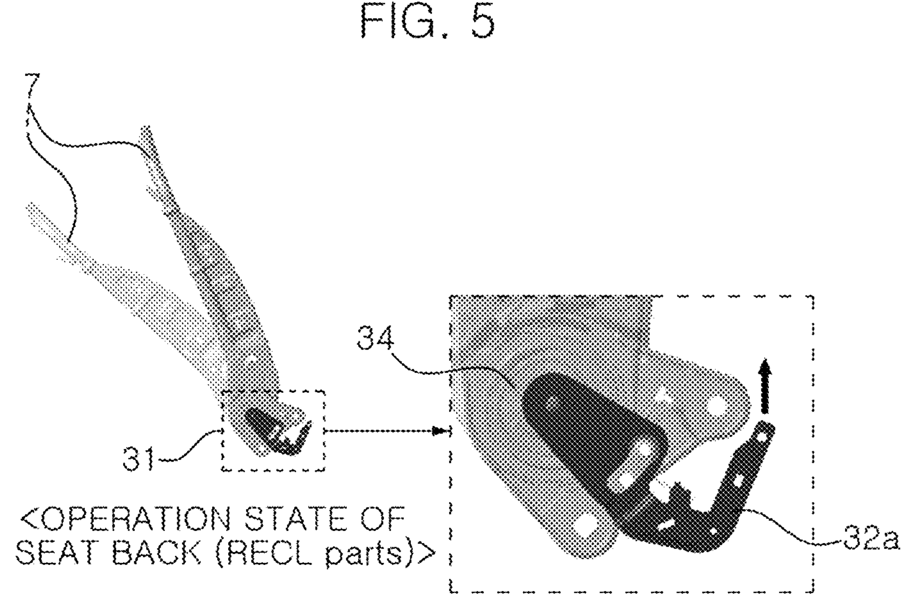

FIG. 4 and FIG. 5 illustrate a detailed configuration of the back angle adjustment unit 31.

As illustrated, the back angle adjustment unit 31 is configured with the recliner lever 32, the recliner lever bracket 32a, a memory recliner 33, and the relaxation cable 39. With the present configuration, when the seat back 6 of the vehicle seat 1 is operated in the relaxation mode, the back angle adjustment unit 31 enables the operation of the seat back 6 in conjunction with the relaxation mode for the seat back 6.

As an exemplary embodiment of the present disclosure, the recliner lever bracket 32a is connected to the recliner lever 32, and when recliner lever 32 is operated, is moved together therewith, operating the recliner 34.

As an exemplary embodiment of the present disclosure, the memory recliner 33 is configured with the recliner 34 and a relaxation memory 35. The recliner 34 is operated to recline the seat back 6, in conjunction with the recliner lever bracket 32a. The relaxation memory 35 is operated in conjunction with the relaxation cable 39 which is pulled in the relaxation mode.

To the present end, the relaxation memory 35 includes a cam 35a and a lower tooth 35b. When the relaxation cable 39 is pulled, the cam 35a is rotated in the clockwise direction thereof. When the cam 35a is rotated, the lower tooth 35b is rotated in the counterclockwise direction, enabling the relaxation memory 35 to switch to a locked-off state.

Therefore, when the relaxation cable 39, the cam 35a, and the lower tooth 35b are rotated, the relaxation memory 35 switches to the locked-off state, enabling the seat back 6 to be moved backward in conjunction with the relaxation mode for the seat cushion 2.

As an exemplary embodiment of the present disclosure, in the relaxation mode, the relaxation cable 39 is pulled by the relaxation cable bracket 23a of the relaxation lever link 23, enabling the seat back 6 to switch to the relaxation mode.

Figure 6:
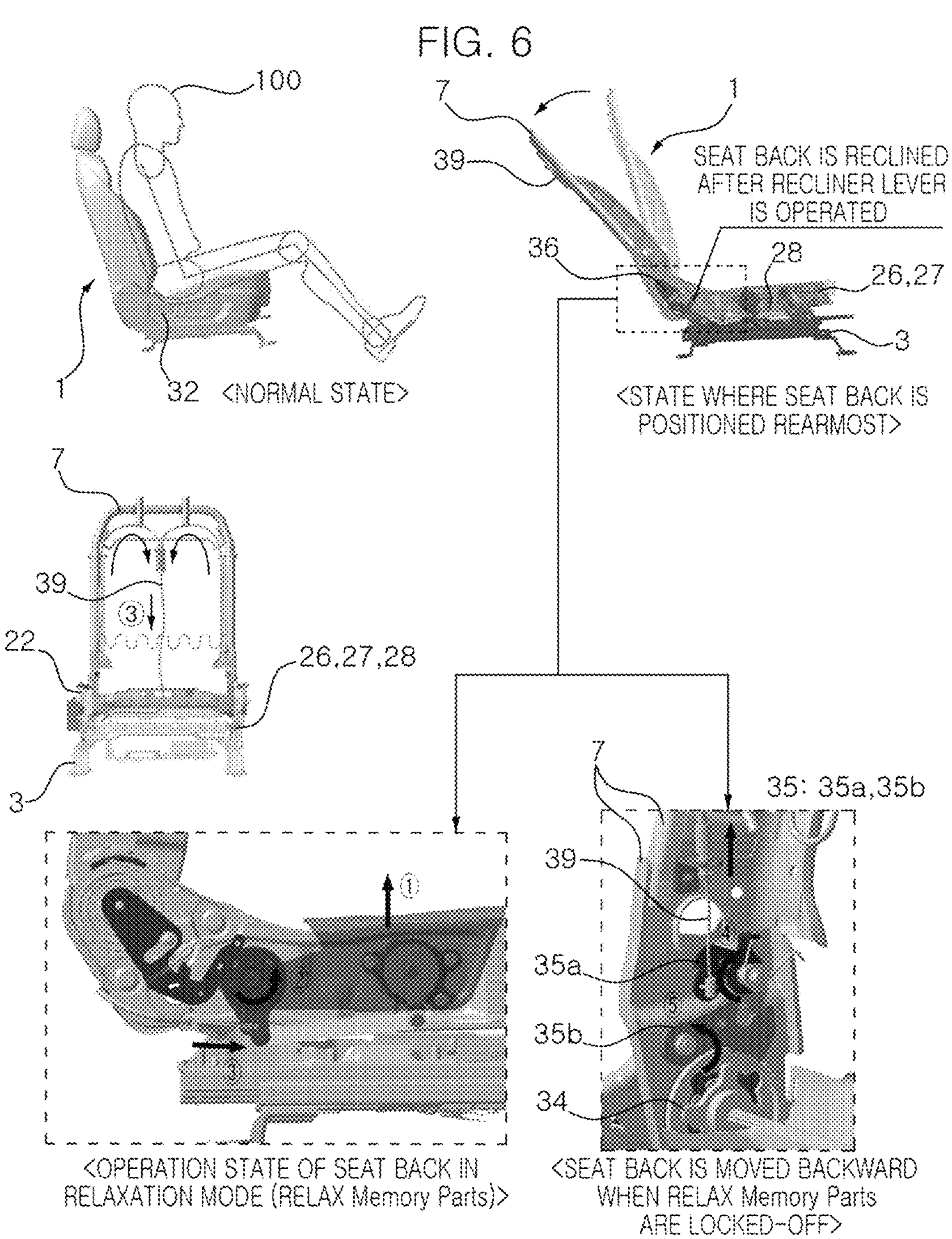
FIG. 6 is a view exemplarily illustrating a state where switching to a relaxation mode for a seat back is executed through the back angle adjustment unit of the relaxation seat mode execution apparatus according to an exemplary embodiment of the present disclosure.
Figure 7:
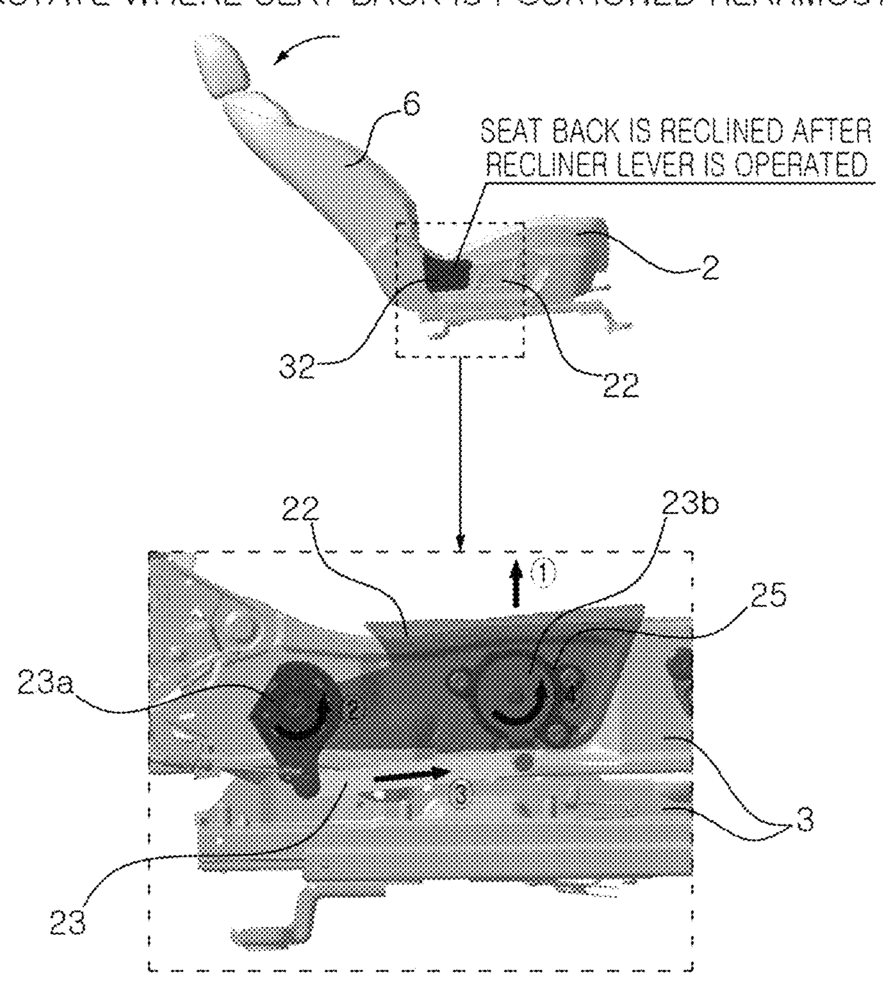
FIG. 7 and FIG. 8 are views, each illustrating a state where switching to a relaxation mode for a seat cushion is executed through a cushion angle adjustment unit of the relaxation seat mode execution apparatus according to an exemplary embodiment of the present disclosure.
Figure 8:
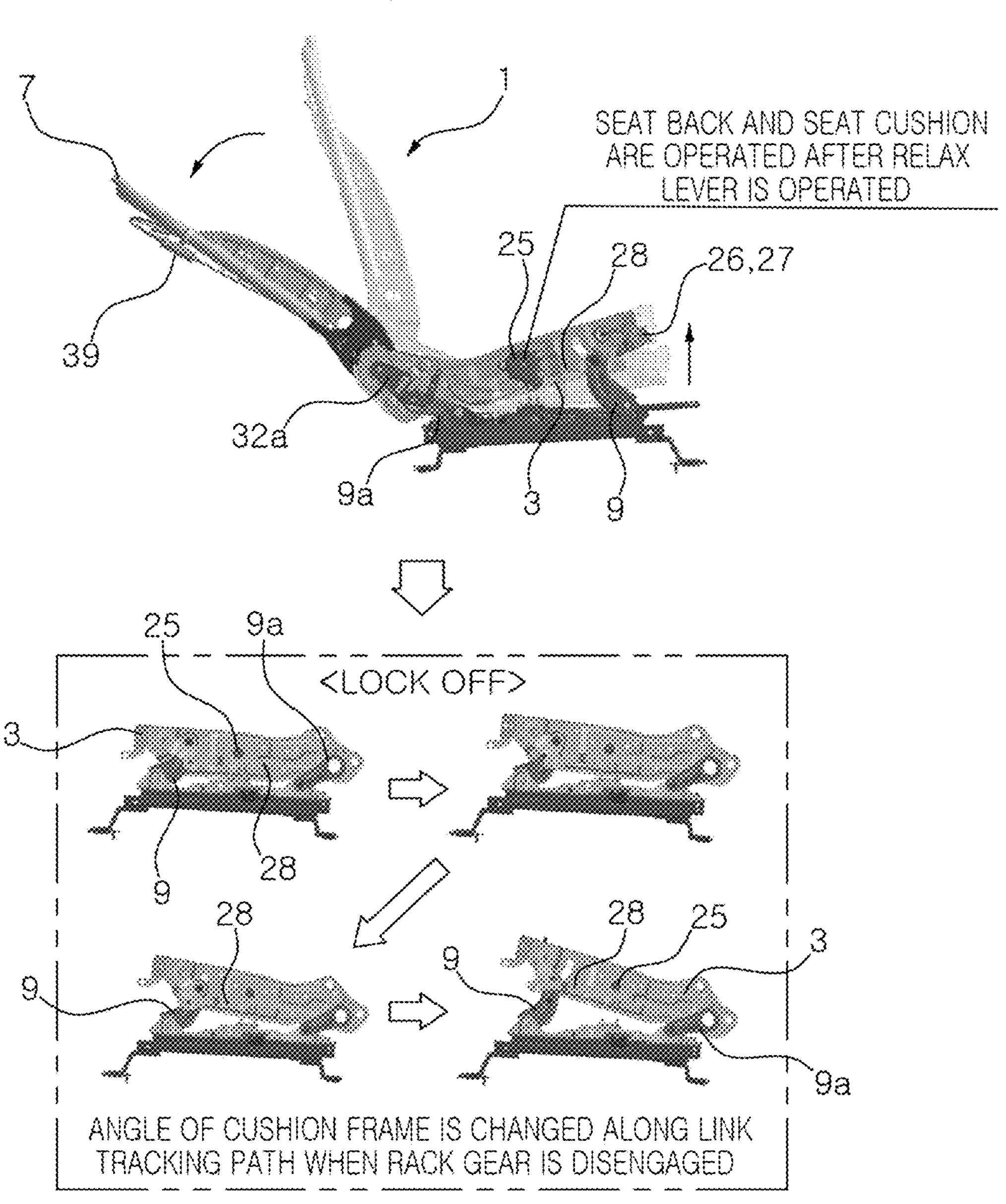

FIG. 6, FIG. 7, and FIG. 8 illustrate a cushion angle adjustment operation and a back angle adjustment operation which the lever-type cushion angle adjustment unit 21 and the back angle adjustment unit 31, respectively, perform when the vehicle seat 1 switches from the standard mode to the relaxation mode.

With reference to FIG. 6, the seat back 6 is operated in the relaxation mode when a user 100 moves the relaxation lever 22 in the upward direction in the standard mode (that is, in a normal state) for the vehicle seat 1.

As illustrated, a relaxation mode operation by the seat back 6 results in a back operation state (RELAX Memory Parts) in the relaxation mode and a seat-back rear operation state (RELAX Memory Parts) after locking-off. This relaxation mode operation is performed through operations ① and ② by the lever-type cushion angle adjustment unit 21 and operations ③, ④, and ⑤ by the back angle adjustment unit 31.

As an exemplary embodiment of the present disclosure, the operation ① is performed by lever releasing when the user 100 moves the relaxation lever 22 in the upward direction, and the operation ② is performed when the forward movement of the relaxation lever link 23 rotates, in the counterclockwise direction, the relaxation cable bracket 23a provided on one side of the relaxation lever link 23.

Subsequently, the operation ③ is performed by pulling the relaxation cable 39 connected to the relaxation cable bracket 23a when the relaxation cable bracket 23a is rotated in the counterclockwise direction. The operation ④ is performed by rotating, in the clockwise direction, the cam 35a of the relaxation memory 35 when the relaxation cable 39 is pulled. The operation ⑤ is performed by changing a locked-on state of the seat back 6 to the locked-off state when the clockwise rotation of the cam 35a rotates, in the counterclockwise direction, the lower tooth 35b of the relaxation memory 35.

Accordingly, the seat back 6 is reclined when the operation of the recliner lever 32 operates a recliner lever bracket 32a and the recliner 34, and then is fully reclined when the subsequent operation of the relaxation lever 22. As a result, the relaxation mode for the seat back 6 is executed.

Subsequently, FIG. 7 and FIG. 8 illustrate the relaxation mode operation that the seat cushion 2 performs after the seat back 6 of the vehicle seat 1 is operated in the relaxation mode. In the instant case, the relaxation mode operation by the seat cushion 2 is described as being performed after the relaxation mode operation by the seat back 6. However, the present description is only for convenience. The relaxation mode operation by the seat back 6 may also be performed after the relaxation mode operation by the seat cushion 2.

With reference to FIG. 7, the operation by the relaxation lever 22 is performed by performing the operation ①, the operations ② and ③ by the lever-type cushion angle adjustment unit 21 and the operation ④ by the stepless brake 25.

As an exemplary embodiment of the present disclosure, the operation ① is performed by lever releasing when the user 100 moves the relaxation lever 22 in the upward direction, the operation ② is performed when the forward movement of the relaxation lever link 23 rotates, in the counterclockwise direction, the relaxation cable bracket 23*a* provided on one side of the relaxation lever link 23, and the operation ③ is performed by moving forward the relaxation lever link 23 when the user 100 moves the relaxation lever 22 in the upward direction with respect to the cushion frame 3 of the seat cushion 2.

Subsequently, the operation ④ is performed by changing a locked-on state of the stepless brake 25 with respect to the rack bar 28 to the locked-off state when the forward movement of the relaxation lever link 23 rotates, in the counterclockwise direction, the stepless brake bracket 23*b* positioned on the opposite side of the relaxation cable bracket 23*a*.

With reference to FIG. 8, the switching to the relaxation mode for the seat cushion 2 is performed when the user 100 raises a front portion of the seat cushion 2 in the locked-off state where rocking is disabled between the stepless brake 25 and the rack bar 28 (that is, in a state where the rack bar 28 is not constrained).

The ascending of the front portion of the seat cushion 2 raises the cushion frame 3 operating in conjunction with the front cushion link 9, and the movement of the cushion frame 3 moves the rack bar 28 forward along the link tracking path thereof in a state where the rack gear of the rack bar 28 is engaged with a pinion of the stepless brake 25.

Accordingly, the seat cushion 2 is raised by a distance equivalent to the forward movement of the rack bar 28 along the link tracking path thereof, performing the switching to the relaxation mode.

Accordingly, the vehicle seat 1 fully switches to the relaxation mode in which the seat cushion 2 is raised, and at the same time, the seat back 6 is reclined.

When the user 100 who wants to switch from the relaxation mode for the vehicle seat 1 to the standard mode pushes the relaxation lever 22 in the downward direction, all the components in question are operated in the reverse direction due to the lever locking.

That is, when the relaxation lever 22 is pushed downwards, the backward movement of the relaxation lever link 23 rotates the relaxation cable bracket 23*a* in the clockwise direction, thereby no longer enabling the relaxation cable 39 to be pulled. The counterclockwise rotation of the cam 35*a* of the relaxation memory 35 and the clockwise direction of the lower tooth 35*b* returns the seat back 6 from the reclined state thereof to the original state thereof. Subsequently, when the cushion frame 3 is lowered, the rack bar 28 is moved, in the opposite direction by a distance equivalent to the movement thereof along the link tracking path, back to the original state thereof, enabling the seat cushion 2 in the raised state to return to the initial state thereof.

Figure 9:
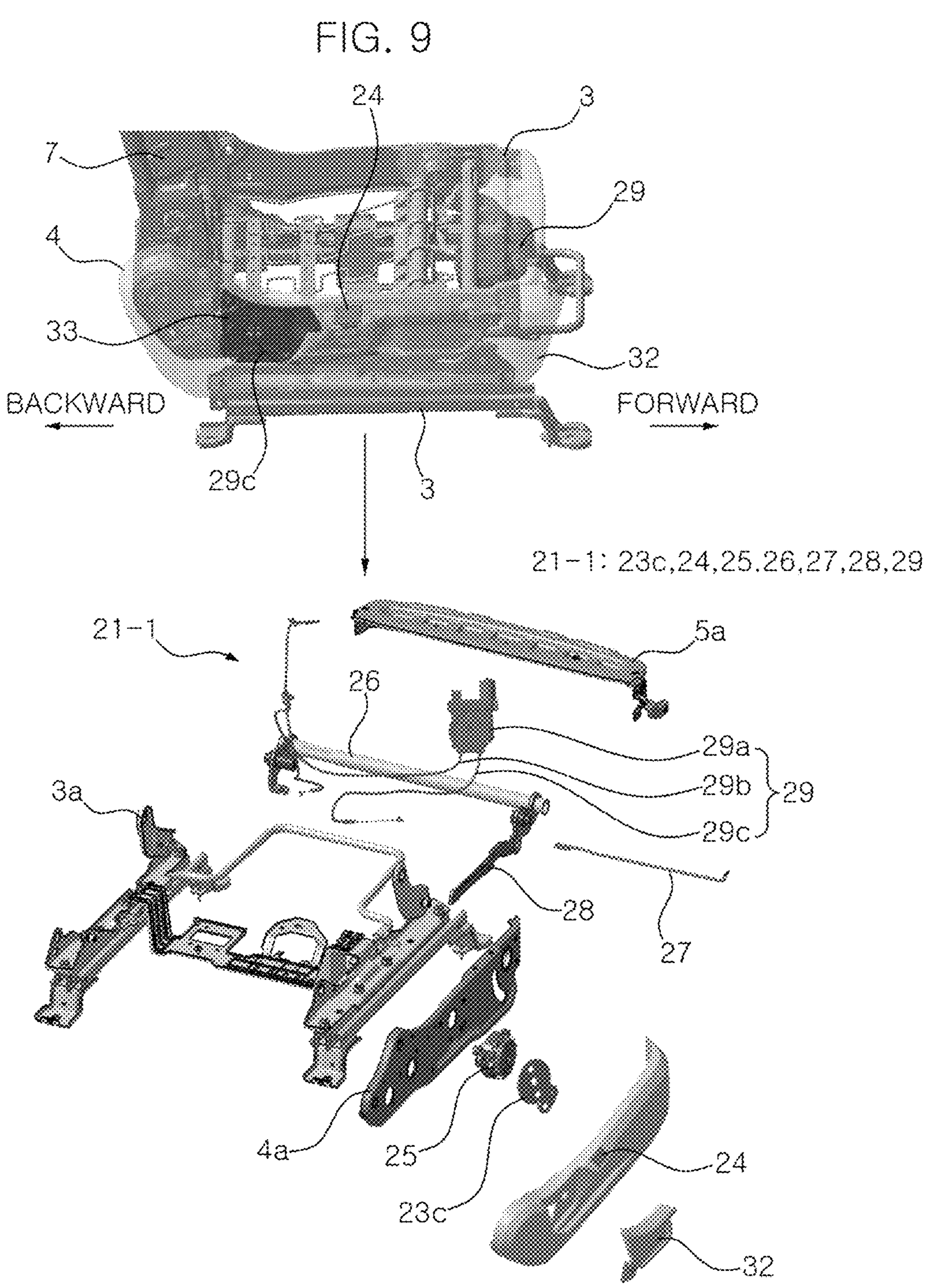
FIG. 9 is a view exemplarily illustrating an example where the cushion angle adjustment unit of the relaxation seat mode execution apparatus according to an exemplary embodiment of the present disclosure is a button-type.
Figure 10:
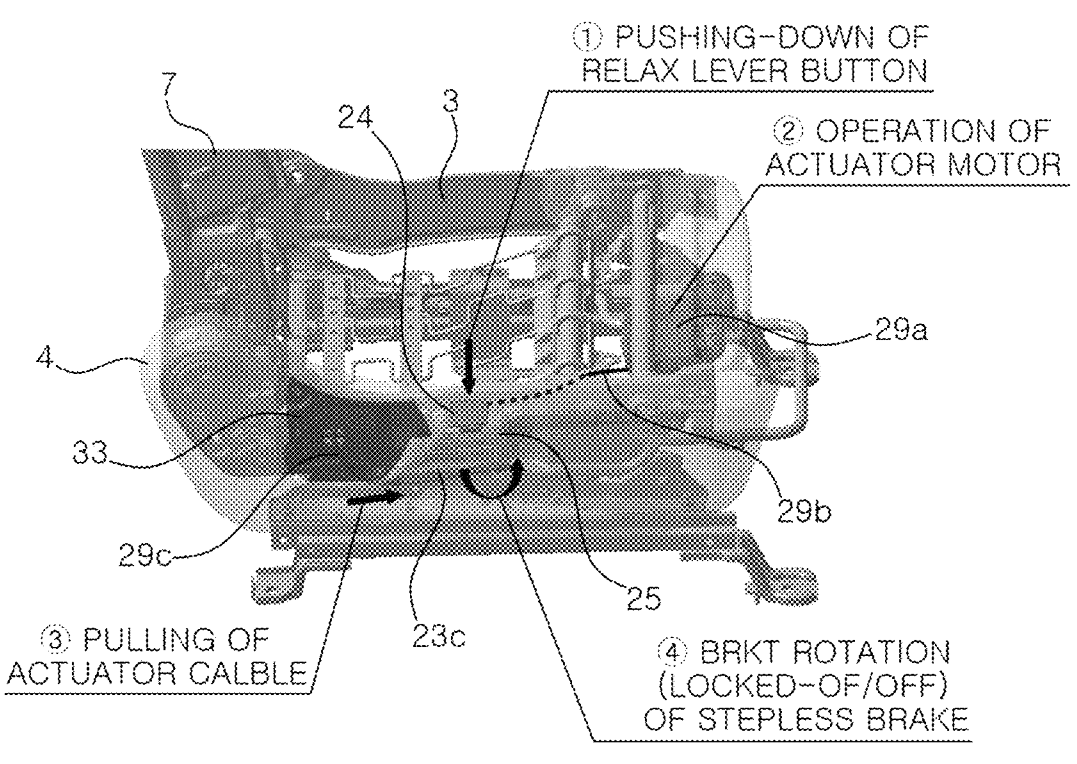
FIG. 10 is a view exemplarily illustrating a button-type cushion angle adjustment unit according to an exemplary embodiment of the present disclosure.

FIG. 9 and FIG. 10 illustrate a state where, in a relaxation seat mode execution apparatus, a button-type cushion angle adjustment unit 21-1, configured as a substitution for the lever-type cushion angle adjustment unit 21 for adjusting a cushion angle, is operated.

With reference to FIG. 9, button-type cushion angle adjustment unit 21-1 is configured with a relaxation lever bracket 23*c*, a relaxation button lever 24, the stepless brake 25, the spring rod 26, the torsional spring 27, the rack bar 28, and a motive power unit 29, while the lever-type cushion angle adjustment unit 21 in FIG. 2 is configured with the relaxation lever 22, the relaxation lever link 23, the stepless brake 25, the spring rod 26, the torsional spring 27, and the rack bar 28.

Therefore, the difference of the button-type cushion angle adjustment unit 21-1 from the lever-type cushion angle adjustment unit 21 is that the relaxation button lever 24 and the relaxation lever bracket 23*c* are used instead of the relaxation lever 22 and the relaxation lever link 23, respectively, and that the motive power unit 29 generating motive power by operating the relaxation button lever 24 is used.

As an exemplary embodiment of the present disclosure, the relaxation button lever 24 is configured as a pushing-type button, operated in conjunction with a spring, which is pushed down to operate an electric contact point and is again pushed down to return to the original state thereof. To the present end, the relaxation button lever 24, operating in conjunction with an internal structure of the external cover 4, compresses the spring when pushed down one time, being hooked onto the internal structure of the external cover 4. Furthermore, the relaxation button lever 24 is not hooked onto the internal structure of the external cover 4, when pushed down two times, returning to the original state thereof due to a restoring force.

The relaxation button lever 24 generates an electric signal for rotating an actuator 29*a* of the motive power unit 29 in the forward direction and the backward direction by contact with or separation from a signal line 29*b*-side terminal of the motive power unit 29.

As an exemplary embodiment of the present disclosure, the relaxation lever bracket 23*c* is so circular plate-shaped that it is coupled to a casing of the stepless brake 25 inside the external cover 4. A lower portion of the relaxation lever bracket 23*c* is connected to a motor cable 29*c* of the motive power unit 29. The stepless brake 25 is rotated in the counterclockwise direction by pulling the motor cable 29*c*.

The motive power unit 29 is configured with an actuator 29*a*, a signal line 29*b*, and a motor cable 29*c*. In the instant case, the actuator 29*a* is a reversible motor.

As an exemplary embodiment of the present disclosure, the actuator 29*a* is positioned at the front of the seat cushion 2 and is enclosed by a cushion panel 5*a* because a track frame and a motor housing are coupled to each other inwardly from the track 3*a* of the cushion frame 3 of the seat cushion 2. In the instant case, it may connect the actuator 29*a* to a vehicle battery using an electric power line to be supplied with the vehicle battery supplying electric power to a vehicle system mounted in a vehicle. However, a dedicated battery which is chargeable or replaceable may be used.

As an exemplary embodiment of the present disclosure, the signal line 29*b* includes a terminal that comes into contact with the relaxation button lever 24 and is connected to the actuator 29*a*. When the relaxation button lever 24 is pushed downwards, the signal line 29*b* generates a forward rotation signal upon contact or a backward rotation signal upon separation, driving or stopping the actuator 29*a*. In the instant case, the forward rotation signal upon contact and the backward rotation signal upon separation may be generated as the forward rotation signal upon separation and the backward rotation signal upon contact, respectively.

As an exemplary embodiment of the present disclosure, the motor cable 29*c* is connected to a lower portion of the relaxation lever bracket 23*c* in a state where one end portion thereof is fixed to a motor shaft of the actuator 29*a* or a speed reduction gear, and the other end portion thereof on the opposite side is fixed to the memory recliner 33.

Therefore, the motor cable 29*c* is pulled by the rotation (for example, the forward direction or the backward direction) of a motor of the actuator 29*a*, rotating the relaxation lever bracket 23*c* in the counterclockwise direction thereof. Consequently, the relaxation mode for the relaxation memory 35 is executed.

With reference to FIG. 10, the difference of the button-type cushion angle adjustment unit 21-1 from the lever-type cushion angle adjustment unit 21 is that the button-type cushion angle adjustment unit 21-1 executes the relaxation mode for the seat back 6 by performing operations ①, ②, ③, and ④ instead of the operations ①and ②in FIG. 6.

As an exemplary embodiment of the present disclosure, the operation ①is to transmit an electric signal to the actuator 29*a* when the relaxation button lever 24 is pushed down through connection to a contact point of the signal line 29*b*. The operation ②is to rotate the motor of the actuator 29*a*. The operation ③is to pull the motor cable 29*c* by the rotation of the motor of the actuator 29*a* to operate the recliner lever bracket 32*a* connecting the relaxation cable 39. The operation ④is to rotate the lower portion of the relaxation lever bracket 23*c* rotating the stepless brake 25, in conjunction with the pulling of the motor cable 29*c*.

In the present manner, the button-type cushion angle adjustment unit 21-1 can provide the convenience of enabling the locked-on and-off of the stepless brake 25 by the rotational power of the actuator 29*a* instead of by a manual operating force of the relaxation lever 22 moving the relaxation lever link 23 in FIG. 6.

Subsequent operations are all performed in the same manner by operation of the lever-type cushion angle adjustment unit 21, which utilizes the stepless brake 25, the spring rod 26, the torsional spring 27, and the rack bar 28, and the operation of the back angle adjustment unit 31, which utilizes the recliner lever 32, the recliner lever bracket 32*a*, the memory recliner 33, and the relaxation cable 39. These constituent elements are described with reference to FIG. 1, FIG. 2, FIG. 3, FIG. 4, FIG. 5, FIG. 6, FIG. 7, and FIG. 8. Therefore, descriptions of the subsequent operations are omitted.

As described above, the one-touch relaxation mode switching-type vehicle seat 1 according to an exemplary embodiment of the present disclosure includes the relaxation button lever 24, operating in conjunction with the relaxation lever 22 or the actuator 29*a*, on the lateral side of the seat cushion 2, along with the recliner lever 32 operating the recliner 34 of the seat back 6.

The lever link 23 operating in conjunction with the relaxation lever 22 when the relaxation lever 22 is raised up, or the relaxation lever bracket 23*c* operating in conjunction with the motor cable 29*c* of the actuator 29*a* when the relaxation button lever 24 is pushed down locks off the stepless brake 25. Thus, the rack bar 28 is moved along the link tracking path. As a result, the angle of the cushion frame 3 is changed in the upward direction, and the relaxation cable 39 operating in conjunction with the relaxation lever link 23 or the relaxation memory 35 locks off the relaxation memory 35. In the present manner, the seat back 6 is moved backward thereof.

Therefore, the vehicle seat 1 for one-touch switching to a relaxation mode can apply a one-touch relaxation seat mechanism and can simultaneously perform a cushion angle adjustment function and a seat-back rear adjustment function for positioning the seat back 6 and the seat cushion 2. Thus, the inconvenience of having to separately operate both the seat cushion 2 and the seat back 6 when switching between the standard mode and the relaxation mode may be eliminated.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle seat for one-touch switching to a relaxation mode, the vehicle seat comprising:

a seat cushion and a seat back;

a relaxation lever operated to switch the seat cushion and the seat back from a standard mode in which a user sits on the seat cushion to a relaxation mode in which the user adopts a reclined posture to lie; and a recliner lever operating a recliner of the seat back, the recliner lever being provided on a lateral side of the seat cushion, wherein the seat cushion includes:

a relaxation lever link moved in conjunction with the relaxation lever in raising up the relaxation lever;

a stepless brake locked off through a stepless brake bracket rotated by the movement of the relaxation lever link by the relaxation lever; and a rack bar, wherein a link tracking path for changing an angle of a cushion frame in an upward direction is formed in a state where the rack bar comes into contact with the stepless brake, and wherein the seat back includes:

a relaxation cable operated in conjunction with pulling movement of a relaxation cable bracket of the relaxation lever link to activate the relaxation mode; and a relaxation memory operating in conjunction with the relaxation cable so that the seat back is moved backward in the relaxation mode for the seat cushion.

2. The vehicle seat of claim 1, wherein the relaxation lever and the recliner lever are arranged adjacent to each other.

3. The vehicle seat of claim 1, wherein the relaxation lever link includes a shape of a straight-line bar and includes the relaxation cable bracket at a first end portion thereof and the stepless brake bracket at a second end portion thereof, wherein the relaxation cable bracket pulls the relaxation cable, and wherein the stepless brake bracket enables the stepless brake to switch to a locked-off state.

4. The vehicle seat of claim 3, wherein the relaxation cable bracket and the stepless brake bracket are rotated in a counterclockwise direction in response that the relaxation lever link in the shape of the straight-line bar is moved forward thereof.

5. The vehicle seat of claim 3, wherein the stepless brake bracket is coupled to the stepless brake, rotating the stepless brake.

6. The vehicle seat of claim 1, wherein the stepless brake and the rack bar are moved along the link tracking path in a gear-engaged state.

7. The vehicle seat of claim 1, wherein the rack bar is connected to a spring bracket of a spring rod coupled to one side of the cushion frame.

8. The vehicle seat of claim 7, wherein a torsional spring providing a restoring force to the seat cushion is coupled to the spring bracket of the spring rod.

9. The vehicle seat of claim 1, wherein the relaxation memory is coupled to the recliner.

10. The vehicle seat of claim 9, wherein the relaxation memory is coupled to the recliner which is locked off by the recliner lever.

11. The vehicle seat of claim 10, wherein the relaxation memory is configured with a cam and a lower tooth that are rotated by pulling the relaxation cable, and wherein the rotation of the cam and the lower tooth enables the relaxation memory to switch to a locked-off state so that the seat back is moved backward in the relaxation mode for the seat cushion.

12. The vehicle seat of claim 11, wherein the cam and the lower tooth are rotated in opposite directions.

13. The vehicle seat of claim 1, wherein an opposite portion, pulled by the relaxation lever link, of the relaxation cable is fixed to an upper portion of a back frame.

14. A vehicle seat for one-touch switching to a relaxation mode, the vehicle seat comprising:

a seat cushion and a seat back;

a relaxation button lever operated to switch the seat cushion and the seat back from a standard mode in which a user sits on the seat cushion to the relaxation mode in which the user adopts a reclined posture to lie; and a recliner lever operating a recliner of the seat back, the recliner lever being provided on a lateral side of the seat cushion, wherein the seat cushion includes:

an actuator driven by a contact engagement caused by pushing down the relaxation button lever having a contact formed with a signal line;

a relaxation lever bracket moved in conjunction with a motor cable pulled by the actuator;

a stepless brake locked off through the relaxation lever bracket connected to the motor cable for being pulled thereby; and a rack bar, a link tracking path for changing an angle of a cushion frame in an upward direction being formed in a state where the rack bar comes into contact with the stepless brake, and wherein the seat back includes:

a relaxation memory connected to the motor cable so that the seat back is moved backward in the relaxation mode for the seat cushion; and a relaxation cable which operates the relaxation mode in conjunction with movement of the relaxation memory rotated by the relaxation lever bracket connected to the motor cable that pulls a recliner lever bracket.

15. The vehicle seat of claim 14, wherein the relaxation button lever and the actuator are connected to each other by the signal line.

16. The vehicle seat of claim 14, wherein a lower portion in a shape of a circular plate, coupled to the stepless brake, of the relaxation lever bracket is connected to the relaxation cable, and thus the relaxation lever bracket is operated in conjunction with movement of the motor cable.

17. The vehicle seat of claim 14, wherein the stepless brake and the rack bar are moved along the link tracking path, and wherein the rack bar is connected to a spring bracket of a spring rod including a torsional spring providing a restoring force to the seat cushion and is positioned on one side of the cushion frame.

18. The vehicle seat of claim 14, wherein the relaxation memory is connected to the recliner locked off by the recliner lever, and is configured with a cam and a lower tooth that are rotated in response to pulling of the relaxation cable, and wherein the rotation in opposite directions of the cam and the lower tooth enables the relaxation memory to switch to a locked-off state so that the seat back is moved backward in the relaxation mode for the seat cushion.

19. The vehicle seat of claim 14, wherein an opposite portion, pulled by the relaxation memory, of the relaxation cable is fixed to an upper portion of a back frame.

* * * * *